United States Patent

[11] 3,599,958

| [72] | Inventor | Rudolf R. Schindler |
| | | Los Angeles, Calif. |
| [21] | Appl. No. | 782,985 |
| [22] | Filed | Dec. 11, 1968 |
| [45] | Patented | Aug. 17, 1971 |
| [73] | Assignee | Omark-Winslow Aerospace Tool Co. |
| | | Portland, Oreg. |

[54] ACTUATOR FOR EXPANSIVE COLLET SLEEVE DEVICE ADAPTED FOR SECURING MACHINE TOOL TO WORKPIECE OR ANCHORAGE MEMBER
8 Claims, 6 Drawing Figs.

[52] U.S. Cl. .................................................. 269/48.1,
269/48, 77/13, 173/32, 85/81
[51] Int. Cl. .................................................. B23b 45/14,
B23q 3/14
[50] Field of Search .................................................. 173/32, 33;
85/5 E, 5 M, 81; 77/13, 55, 55 G; 279/2;
269/99—102, 48, 48.1, 49; 24/211

[56] References Cited
UNITED STATES PATENTS

| 2,909,949 | 10/1959 | Winslow | 77/13 |
| 3,426,399 | 2/1969 | Jones | 85/81 X |

Primary Examiner—Francis S. Husar
Attorney—Forrest J. Lilly

ABSTRACT: A device for securing a machine tool, such as a power drill, to a workpiece or a jig, using a plot hole in the workpiece or jig, and a radially expansive collet sleeve which is thrust from the machine tool into the pilot hole, and then expanded therein by a mandrel running through the collet sleeve and acting through a cam to expand the collet. The expansive collet sleeve is mounted in and projects from a holder sleeve which is reciprocable through a guide bore in a workpiece-engaging member on the drill. The holder sleeve is advanced through this guide bore to project the collet sleeve through the pilot hole in the workpiece, and the mandrel is then operated to expand the collet sleeve into locking relationship with the pilot hole.

PATENTED AUG 17 1971 3,599,958
SHEET 1 OF 3
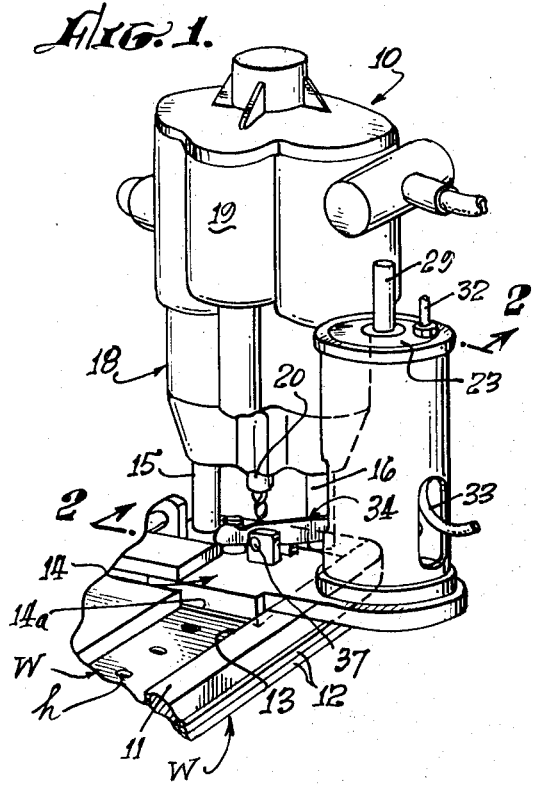
FIG.1.
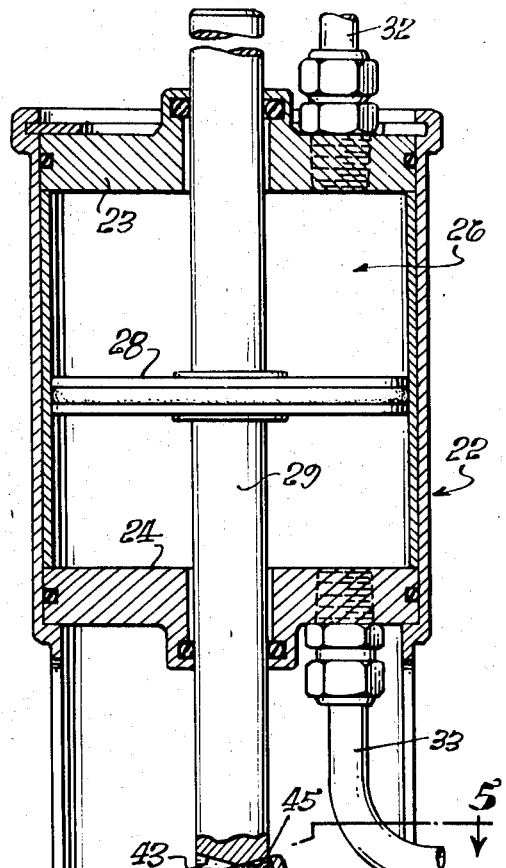
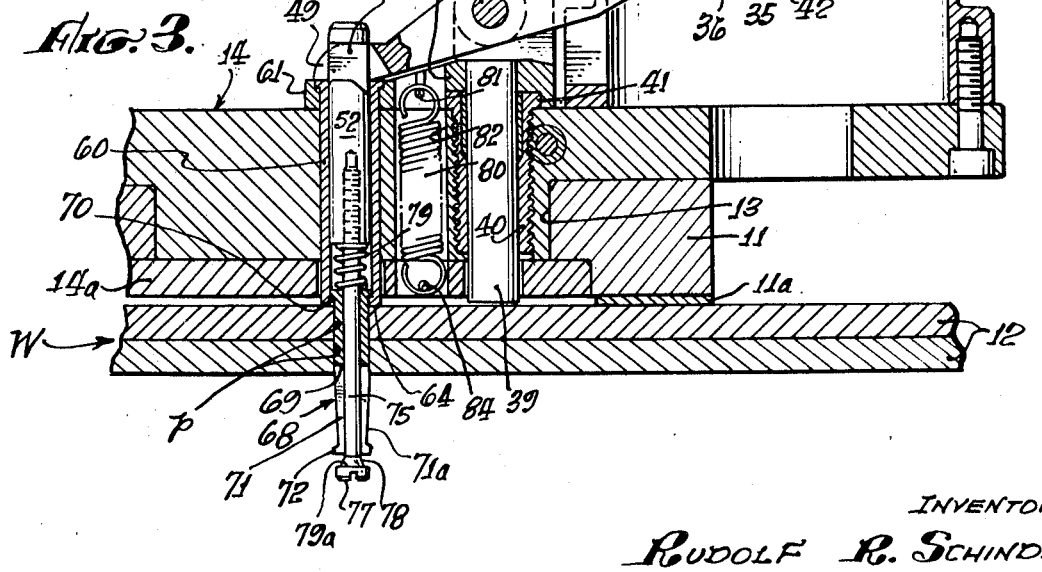
FIG.3.
INVENTOR.
RUDOLF R. SCHINDLER,
By Forrest J. Lilly
ATTORNEY.

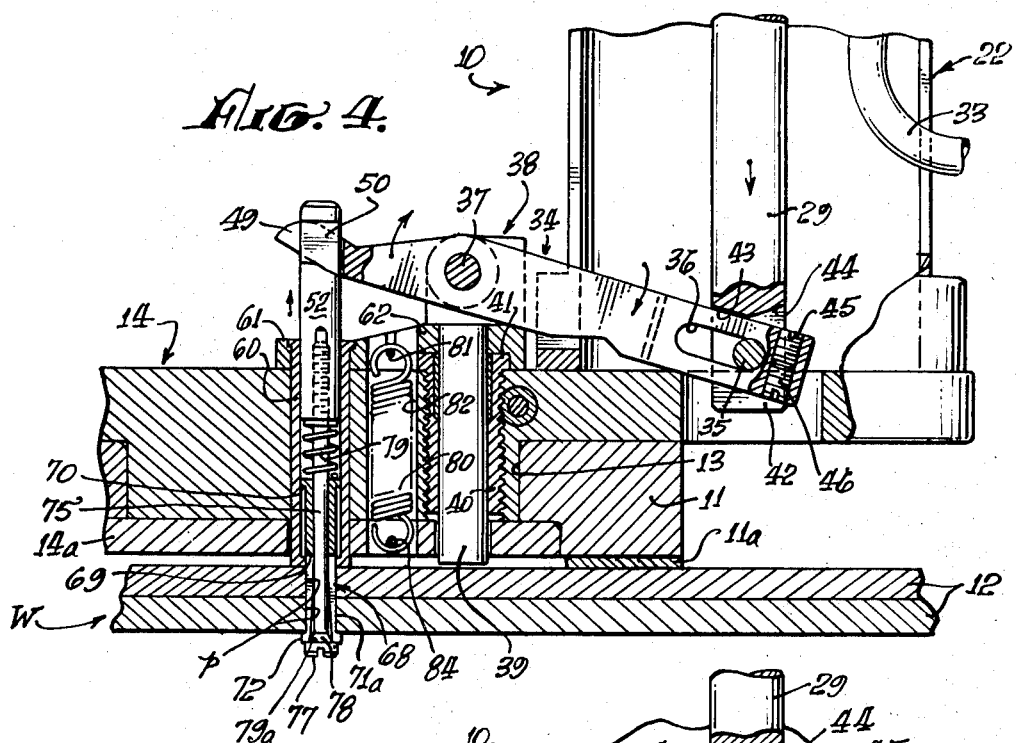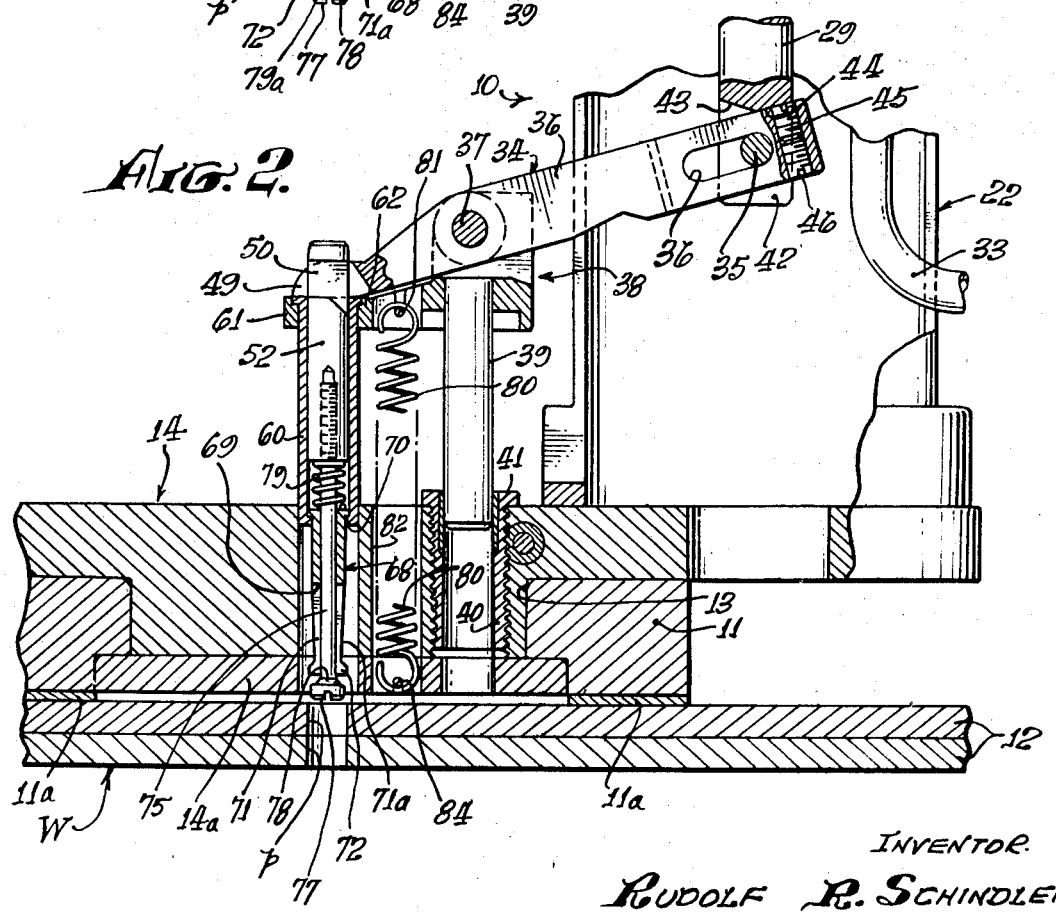

INVENTOR.
RUDOLF R. SCHINDLER,
By *Forrest Lilly*
ATTORNEY.

ACTUATOR FOR EXPANSIVE COLLET SLEEVE DEVICE ADAPTED FOR SECURING MACHINE TOOL TO WORKPIECE OR ANCHORAGE MEMBER

FIELD OF THE INVENTION

This invention relates generally to expansive collet sleeve devices for securing tools to workpieces, and particularly and illustratively to improved expansive collet devices for securing a drill to a workpiece, or a jig, through insertion and then expansion of an expansive collet in a previously drilled pilot hole.

BACKGROUND OF THE INVENTION

In the drilling of a long series of spaced rivet holes through the skin of an aircraft component, for example, it has been common to use a pneumatic drill, such as disclosed in U.S. Pat. No. 2,909,949 to James C. Winslow which is equipped with an expansive collet sleeve adapted for insertion through and then expansion within a previously drilled "pilot" hole. A characteristic of this device is that the drill machine has to be moved bodily toward the work to insert the collet into the pilot hole. This drill has two pistons, which move in a predetermined sequential cycle of relative movements to effect the proper cycle of movements of the expansive collet sleeve, and a mandrel by which it is expanded. These need not be described herein.

SUMMARY OF THE INVENTION

The invention uses a split collet sleeve and mandrel or drawbar assembly, of the type originally disclosed in the aforementioned U.S. Pat. No. 2,909,949. However, this assembly is mounted in a holder sleeve which is reciprocable through a guide bore in the support member that engages the workpiece, or alternatively, a jig secured to the work. A collet-operating mechanism is provided by which the holder sleeve is advanced through the guide bore in the support member, with the support member stationary, and the collect sleeve is thereby projected through the pilot hole in the work or jig, as the case may be. The collet operating mechanism includes a lever which then pivots to retract and operate the mandrel and collet. The details of this mechanism can best be left for description in the course of the description of a specific embodiment of the invention.

BRIEF DESCRIPTION OF THE DRAWINGS

The invention will be better understood, and certain additional features thereof disclosed and explained, in the course of the following detailed description of an illustrative embodiment thereof, reference for this purpose being had to the accompanying drawings, in which:

FIG. 1 is a perspective view of a portion of a drilling apparatus incorporating improvements of the present invention;

FIGS. 2, 3, and 4 are sectional views of the apparatus, in different positions of the operating cycle, taken in accordance with the broken line 2–2 of FIG. 1;

DESCRIPTION OF A PREFERRED EMBODIMENT

Figure 5:
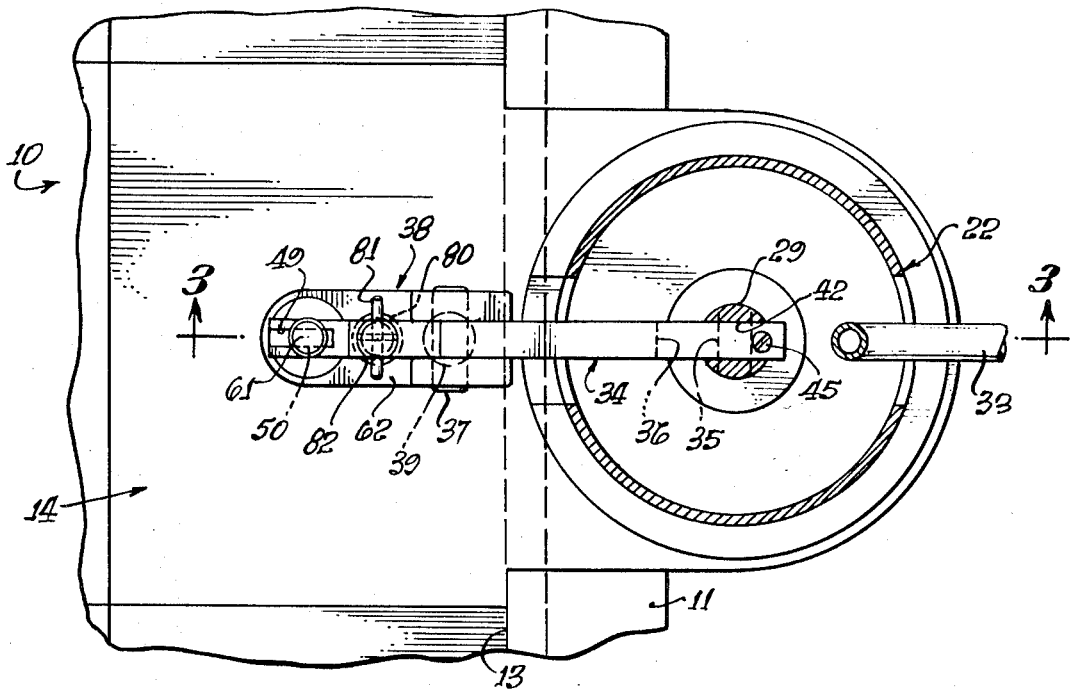
FIG. 5 is a section taken on the broken line 5–5 of FIG. 3.
Figure 6:
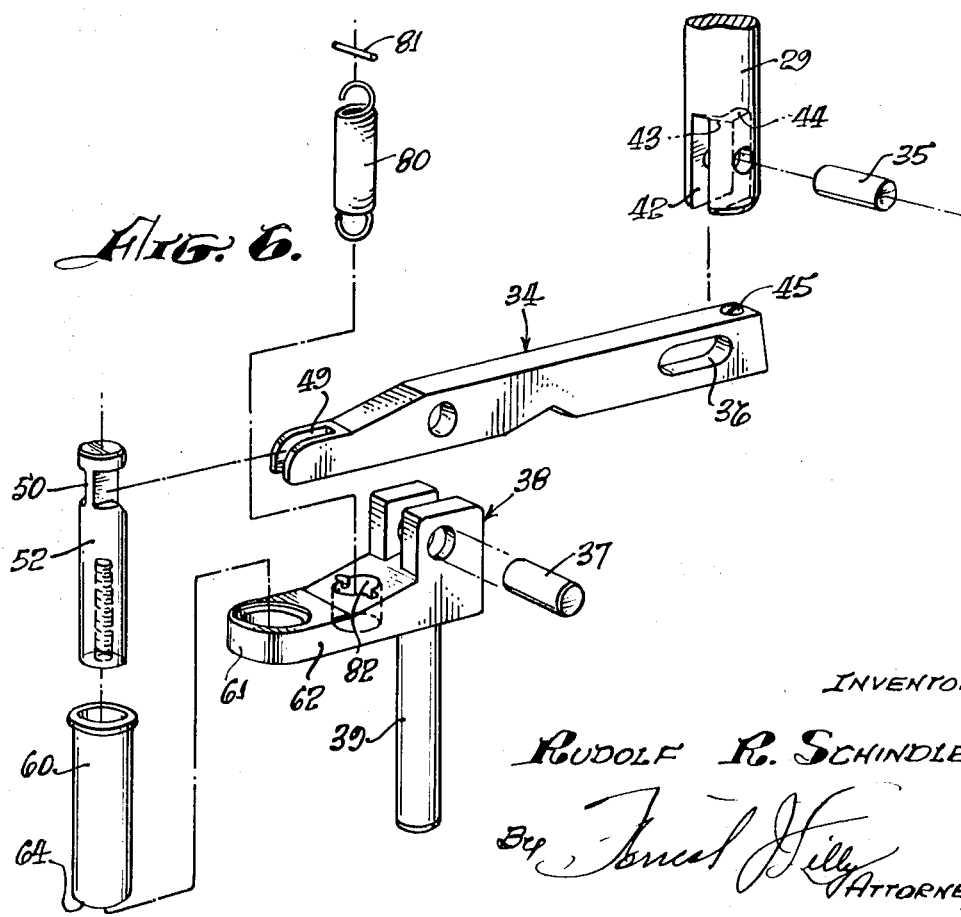
FIG. 6 is an exploded view of certain parts of the collet-operating mechanism of the invention.

Referring now to the drawings, and first to FIG. 1, the numeral 10 designates generally a drilling apparatus understood to have a collet in accordance with the invention. The apparatus 10 includes a drill carriage 11 which supports the drilling apparatus and which, in the present example, is adapted for sliding movement along a guide rail, not shown, but understood to be fixed in any suitable fashion to or relative to the work W. The work in this case illustrated as a pair of plates 12 which are to be drilled with a row of uniformly spaced holes h. The carriage 11 is slotted as at 13, so as to form a slideway and a support for a slide 14. The slide serves as a mount for the collect mechanism. From FIG. 2, it will be seen that the slide has a T-shaped cross section, with its stem received in the slot 13 of carriage 11. The top of the T rests down on the carriage, and a plate 14a affixed to the slide at the bottom of the T engaging under the two side parts of the carriage. The T-shaped slide 14 is slidable along the carriage 11 to selected positions. The carriage and slide comprise, together, a support means for the collecting mechanism.

A slotted base plate 11a at the bottom of the carriage engages the work W. Carriage 11 supports the drilling apparatus. In an alternative arrangement, the carriage 11 may engage a jig, instead of the work W directly, and the jig will then engage and be secured to the work. Anchorage may thus be made directly to the work, or indirectly through a jig, as will readily be understood.

Two the purpose of the claims, the expression "object" will be used to denote either the workpiece directly, or such a jig as mentioned, or the equivalent.

Two feed rods 15 and 16 rise from the carriage 11, to which they are fixed, and are telescopically received within the drill body 18 above. The drill body has a motor 19, preferably either pneumatic or hydraulic, and drives a drill spindle 20, parallel to and between the rods 15 and 16. This drill spindle is journaled for rotation but supported against axial travel relative to the drill body 18.

It is to be understood that the drill body 18 contains means, e.g., cylinder and piston arrangements, by which the drill body is slowly advanced, and subsequently retracted, on and relative to the feed rods 15 and 16 and the carriage 11 and work W.

Slide 14 supports a cylinder 22, the lower portion of which is apertured for passage of certain components, as will appear from the drawings, and the upper portion of which is furnished with spaced heads 23 and 24 affording a fluid pressure cylinder 26. The fluid used may be either pressurized air, or a liquid, such as a suitable grade of oil. In the cylinder 26 is a power piston 28 on a piston rod or the rod 29, which extends through and is pressure sealed in heads 23 and 24. Pressure fluid is admissible to and exhaustible from the cylinder chambers above and below piston 28 via fluid conduits 32 and 33, controlled by a suitable valve, e.g., a conventional four-way valve, from a suitable source of pressure fluid, in an obvious manner, not necessary to illustrate. Exhaust fluid may be returned to atmosphere, if air; or to a reservoir, if liquid.

A lever 34 is connected at one end to the lower end of rod 29 by a pin 35 on the rod and a slot 36 in the end of the lever, as shown, and is fulcrummed intermediate its ends, as at 37, on a yoke 38. The latter is on a pin 39 slidably received in an externally threaded bushing 40 which is screwed into a threaded bore in the slide. The bushing has a head 41 which is engageable, as a stop, by the underside of the yoke 38. The right-hand extremity of lever 34, as viewed in FIGS. 2, 3, and 4, is freely received in a slot 42 in the lower end of rod 29, and the upper end of this slot is defined by two angularly disposed stop surfaces 43 and 44 which determine the limits of angular swing of the lever 34 (see FIGS. 2, 3, and 4). To accurately position the lever in its angular position of FIGS. 2 or 4, an adjustable set screw 45 is provided which engages the surface 44, and which may be locked in adjustment by a locking screw 46.

The other end of lever 36 is slotted, as at 49, to receive the flattened, web section 50 near the upper extremity of a mandrel-holder pin 52. In effect, the connection as shown simply affords a pivot joint, with latitude provided for the lateral displacement owing to arcuate travel of the lever about its fulcrum.

Pin or head 52 is receivable in a headed guide sleeve 60, whose upper end portion is encircled by the vertically apertured extremity 61 of an arm 62 projecting laterally from yoke 38. In the adjusted position shown in the drawings, this arm 62 rides, in the positions of FIGS. 2 and 3, on the top side of the slide 14. In this position, the lower extremity of the sleeve 60 is located just at or a little above the upper plane of the work W. This lower extremity of sleeve 60 is formed with an inner flange or shoulder 64. It will be noted that, with the pin 52 fully down inside the sleeve 60 (FIG. 2), there is a spacing distance between the lower end of the pin and the sleeve shoulder 64.

An expansive collet or collet sleeve 68 is provided, its rearward extent being slidably receivable inside the opening through shoulder 64, and its rearward extremity having a shoulder 70 slidable within sleeve 60 and engageable with sleeve shoulder 64. In the illustrative embodiment, the collet sleeve 68 is longitudinally split rearwardly from its forward extremity, as at 69, so as to provide a plurality of radially expansive spring fingers 71. The number of these collet fingers can increase with the size of the collet. These spring fingers are formed with forwardly or downwardly convergent exterior surfaces 71a, leading to an abruptly enlarged, radially split, clamp head 72, of a diameter, in the normal or unexpanded condition of the fingers, just slightly less than that of the pilot hole p in the work through which it is to be inserted, or such that it can be readily inserted through such a hole. In other language, each spring finger has a radially outwardly turned toe portion 72, normally capable (when the fingers 71 are not expanded) of easy insertion through a pilot hole p previously made by the drill. When the spring fingers are radially expanded, however, the toe portions 72 expand to a diameter greater than that of the pilot hole p, and thus overlap outside, or catch on, the edges of the hole (see FIG. 4).

A cylindrical stem or mandrel 75 is slidable in the bore of the collet sleeve, which it fits with a free sliding fit, and is threaded into the end of the pin or head 52. The shank of the mandrel slidably fits the bore in the collet sleeve, and its extremity has an enlarged pilot head 77 adapted for entry through the drill or pilot hole p in the work. The inner or rearward side of the pilot head has a frustoconical cam surface 78 around the shank of the mandrel, and when the mandrel is drawn to the position of FIG. 4 relative to the collet sleeve, the spring fingers of the latter are expanded, as clearly illustrated, so that the clamping toes or elements 72 overlap and engage and clamp the work just outside the hole p (FIG. 4). A coil compression spring 79 encircles mandrel 75 between pin 52 and the collet sleeve 68, and acts in a direction to yieldingly hold the collet sleeve 68 normally extended on the mandrel, in the position of FIGS. 2 and 3. In the course of movement of the parts to the position of FIG. 4, the mandrel 75 first moves upwardly relative to the collet sleeve 68, and the frustoconical surface on the mandrel engages and then radially expands the spring arms 71 of the collet sleeve. The spring 79 is made strong enough to cause this to take place without recession of the collet sleeve against the spring. The pilot head 78 and expanded, split, sleeve head or clamp elements 72 then move together up to the position of FIG. 4 as the mandrel is further retracted. Here, the annular rearwardly facing shoulder 79a on the pilot head, around the frustoconical surface 71a, makes a clamping engagement against the collet clamp elements 72, forcing them tightly against the work.

A coil tension spring 80 is connected at one end to the yoke arm 62, as at 81, and at the other to the carriage structure, at the bottom of a vertical bore 82 therein, as at 84, and acts to urge the yoke to move toward the work, i.e., from the position of FIG. 2 to that of FIG. 3.

Operation of the colleting system of the invention is as follows:

FIG. 2 shows the device in its initial position of the operating cycle, the power piston 28 being in its uppermost position as shown in phantom lines in FIG. 3. It will be noted that the collet sleeve 68 and the mandrel are spaced above the work W. The previously drilled pilot hole in the work is designated at p, and it will be seen that the collet sleeve 68 and pilot head 77 are positioned directly over and in alignment with the hole p. It will be noted in FIG. 2 that the lever 36 is in its down tilted position in the direction of counterclockwise swing, and also that the yoke 38, together with the pin 39, are elevated the spring 80 being expanded, and acting in the direction to bodily lower the fulcrum 37 and the lever, which are being held up by the raised piston 28. Note that the spring 80 functions to yieldingly hold the lever 34 positioned at a fixed angle relative to stem 29, which relation will then be preserved as the stem, lever 34, fulcrum 37, and yoke 38 descend bodily to the position of FIG. 3.

The parts being thus in the position of FIG. 2, to initiate the working cycle, fluid under pressure is admitted to the upper chamber of cylinder 26 via fluid line 32, and acts to lower the piston 28 and its rod 29, and, with the cooperation of spring 80, to lower also the lever 36, yoke 38, with its pin 39, and the collet assembly 52, 60, 68, and 75, to the position shown in FIG. 3. The collet sleeve 68 is thereby inserted in the pilot hole p in the work W, the support means or slide 14 remaining stationary. The collet spring 79 thus at this time holds the telescopically related collet sleeve 68 and the sleeve 60 in the extended position.

Pressure fluid continues to be admitted into the chamber of cylinder 26, above piston 28, causing the piston 28 and its rod 29 to descend to the position of FIG. 4. It will be noted that in reaching the position of FIG. 2, the yoke 38 bottoms out on the upper end of the threaded sleeve or bushing 40. The pivot afforded by the yoke for the lever 36 accordingly becomes stationary as the position of FIG. 3 is passed through, so that as the piston 28 and its rod 29 continue to descend to the position of FIG. 4, the lever 36 then rocks clockwise on its fulcrum, as indicated in FIG. 4, drawing the mandrel-holder pin 52 upwardly to the position shown in FIG. 4. In the course of this rise of the mandrel-holder pin 52, the mandrel 75 is drawn up relatively to the collet sleeve 68, as before noted. The coil compression spring 79, as said before, is made strong enough to hold the mandrel sleeve 68 downwardly against the shoulder 64 of the sleeve 60 while the mandrel 75 is pulled upwardly, and the frustoconical cam surface 78 on the rearward side of the pilot head 77 engages the lower extremities of the spring fingers 71 of the collet 68 and spreads them radially apart. The mandrel continues to retract to the position shown in FIG. 4, at which time the shoulder 79a on the pilot head clamps the spring finger clamping elements 72 against the work.

It is important to understand that the coil spring 79 is strong enough to hold the collet sleeve 68 downwardly until the spring fingers of the latter are thus cammed outwardly, so as to be engageable with the under side of the work around the pilot hole p. The parts thus move automatically to the position of FIG. 4, wherein the interengaged pilot head 78 and radially spread clamp elements 72 engage the under side of the work, around the pilot hole p. It will be noted that the collet sleeve has been substantially elevated relative to the sleeve 60 and its shoulder 64, and that the mandrel and pilot head have been elevated a shorter distance relative to the collet sleeve. The work is thus secured against the bottom end of the sleeve 60 and against the bottom of the carriage 11, and is therefore secured relative to slide 14. The drill may then be operated to drill a further hole in the work. After or during retraction of the drill, fluid under pressure is admitted to the lower end of the cylinder 26 via fluid line 33. This elevates the piston 28, which acts through rod 29 first to pivot the lever 36 in a counterclockwise direction, so as to lower the mandrel and permit contraction of the spring fingers of the collet sleeve, the parts thus going to the position shown in FIG. 3. Thereafter, as piston 28 continues to rise, the parts return to the original position of FIG. 2, wherein the collet sleeve and pilot head 77 are fully retracted from the work.

I claim:

1. In a device of the character described, for securing anchorage to an object having a preformed pilot hole therethrough, the combination of:

a support means including a sleeve guide;

a guide sleeve axially movable in said sleeve guide;

said support means being stationarily positionable relative to said object with said guide sleeve axially aligned with said pilot hole therein;

a collet sleeve longitudinally movable in said guide sleeve and projectable therefrom in the direction toward said object and into said pilot hole, the forward portion of said collet sleeve being split into a plurality of normally contracted, radially expansive spring gripping fingers;

means limiting projection of said collet sleeve from said guide sleeve to a predetermined extension relative thereto;

a spring yieldingly urging said collet sleeve to project from said guide sleeve to said predetermined extension;

a mandrel extending through and forwardly of said collet sleeve to a position of extension relative thereto;

cooperable means on said mandrel and on the extremities of said collet sleeve fingers operable, upon retraction of said mandrel from said position of extension relative to said collet sleeve, to radially expand said fingers, said spring being of a strength to support said collet sleeve against the force of the retracting mandrel to accommodate said radial expansion of said fingers;

said guide sleeve, collet sleeve, and mandrel being movable between positions of retraction and extension relative to said support means, with said collet sleeve in its position of extension relative to said guide sleeve, and inserted through said pilot hole when in said position of extension relative to said support member;

collet-actuating means for moving said guide sleeve, collet sleeve, and mandrel from said retracted position to said position of extension; and mandrel-actuating means for thereafter retracting said mandrel relatively to said guide sleeve to cause said cooperable means to radially expand said fingers.

2. The subject matter of claim 1, wherein the extremities of said spring fingers include radially outwardly extending clamp elements receivable when the spring fingers are contracted within said pilot hole but overlapping the edge of said pilot hole when the spring fingers are expanded;

the extremities of said spring fingers projecting beyond said pilot hole when in said position of extension relative to said support member; and an enlarged pilot head on the extremity of said mandrel sized for reception in said pilot hole and for engagement with the extremities of the collet sleeve fingers;

said cooperable means on said mandrel and on the extremities of said collet sleeve fingers including spring finger expander means on said mandrel in back of said pilot head.

3. The subject matter of claim 1, wherein said collet and mandrel-actuating means comprise:

a lever;

means affording a pivotal operative connection between said lever and said mandrel; mandrel;

a fulcrum means for said lever;

means mounting and guiding said fulcrum means for movement relative to said support means along a direction line parallel with said guide sleeve; and power operable means operatively connected to said lever to move said lever and said fulcrum means along said direction line, and to pivot said lever on said fulcrum means.

4. The subject matter of claim 3, including means on said fulcrum means for engaging and moving said guide sleeve to the retracted position thereof in correspondence with movement of said fulcrum means along said direction line in the direction away from said object to which anchorage is to be secured.

5. The subject matter of claim 4, including means limiting the movement of said fulcrum means in the direction toward said object; and a spring for yieldingly urging said fulcrum means to move toward said object.

6. The subject matter of claim 5, wherein said fulcrum means pivotally mounts said lever intermediate the ends thereof, and said mandrel and power means are operatively connected to opposite ends of the lever.

7. The subject matter of claim 1, wherein said collet and mandrel actuating means comprise:

a lever;

means affording a pivotal operative connection between said lever and said mandrel embodying a head on said mandrel slidable in said guide sleeve and a pivot joint between said head and said lever;

a fulcrum means for said lever;

a guide and mounting pin on said fulcrum means and a guide bushing therefor on said support means, said pin and bushing being parallel to said guide sleeve;

means on said fulcrum means and pin engageable with shoulder means on said guide sleeve to move said guide sleeve to its retracted position in correspondence with movement of said pin and fulcrum means in the direction away from said object to which anchorage is to be secured;

a spring urging said fulcrum means to move toward said object;

means limiting the extent of said last-mentioned movement; and power operable means operatively connected to said lever to move said lever and its fulcrum means toward said object by movement of said fulcrum means pin in said bushing to the limit of said movement and thereafter to pivot said lever on said fulcrum means to retract said mandrel.

8. The subject matter of claim 3, including:

means limiting the travel of said fulcrum means in the direction toward said object; and spring means for yieldingly holding said lever in a position relative to its fulcrum means wherein said mandrel is in its said position of extension until said fulcrum means is stopped in its travel toward said object by said limiting means.